Patented Mar. 11, 1941

2,234,637

UNITED STATES PATENT OFFICE 2,234,637

OIL PROSPECTING METHOD

Millard S. Taggart, Jr., Houston, Tex., assignor to Standard Oil Development Company, a corporation of Delaware No Drawing. Application July 22, 1939, Serial No. 285,964

1 Claim. (Cl. 23—230)

The present invention is directed to a method for prospecting for subterranean petroleum deposits. It resides in an improvement in that method according to which samples of soil are subjected to examination for detection of products produced by the action of hydrocarbons or hydrocarbon consuming bacteria.

It has already been proposed to subject soil samples collected over an area under investigation to inspection or treatment for the detection therein of products such as heavy waxy hydrocarbons and color forming agents formed by the action of hydrocarbons, such as ethane, propane and butane, on hydrocarbon consuming bacteria. Such a method is disclosed in application Serial No. 258,811, filed February 27, 1939, in the name of Ludwig W. Blau, and entitled Process for locating valuable subterranean deposits, according to which soil samples are collected systematically over an area to be prospected, and these soil samples are treated with a chemical, such as sodium peroxide, capable of imparting a color change to samples which contain hydrocarbon consuming bacteria which have been subjected to the action of hydrocarbons.

As might be expected, some lack of uniformity in results has been experienced in the practice of this method. It has been determined, for example, that seasonal changes occur in the amount of bacteria in a given soil. Furthermore, it has been ascertained that certain soils appear not to carry bacteria of this type at all. Again, in a certain area under investigation, a large portion of the surface may have been disturbed at a time, perhaps several months, prior to the investigation, so that the propagation of these bacteria in the disturbed soil has been interrupted leading to nonuniformity in results.

According to the present invention, these various factors which disturb the results of this type of prospecting, and particularly the factor which leads to total failure, namely, the total absence from the soil in an area under investigation, of this type of bacteria, are eliminated by planting uniform soil samples in an area to be investigated, inoculating these soil samples with hydrocarbon consuming bacteria, and examining the soil samples after a period of propagation. The period of propagation may be any convenient period but should be at least in the neighborhood of ten days or two weeks. The time interval allowed for propagation introduces no very great inconvenience, however, because where a large area is to be surveyed, it takes from three to four weeks to plant all the samples, so that after the planting of the samples is completed the examination of them can be begun.

The bacteria utilized in the practice of the present invention are referred to generally as "Bacillus methanicus," although two or three different kinds of these bacteria exist and some of them appear to have a greater affinity for higher hydrocarbons than others. These bacteria can be obtained from natural soil samples in areas where they exist in abundance and a culture of them can be made in the laboratory by mixing some of the bacteria with a water solution of salts having plant food value, such as nitrates, potassium compounds, phosphates, calcium compounds, and the like. Preferably, all of the plant foods are included in the culture medium. The bacteria are propagated by being kept under an atmosphere of air and hydrocarbons, such as ethane or propane. The bacteria multiply rapidly whereby a concentrated culture can be obtained in the course of a few days. This culture is then sprayed on the soil samples which are to be planted.

The soil samples to be planted should have a size of at least about 100 cu. in. Most any type of soil can be used for these samples. While it is true that some natural soils do not appear to carry any of these bacteria and, therefore, can be said not to support them, the bacteria, when placed on these soils will multiply if the soil is in an atmosphere of hydrocarbons and air. It has been found possible to inoculate ordinary building sand and use it for the samples. These samples are placed in the area under investigation at any desired intervals, preferably, at least five hundred feet apart. They are placed in holes dug to accommodate their size with their surfaces exposed to the atmosphere.

After a period of propagation these samples are collected and subjected to tests to determine whether or not the bacteria have been subjected further to the action of hydrocarbons, particularly heavy hydrocarbons. Several techniques have been developed for determining this fact. Among them may be mentioned the treatment of the sample with alkaline oxidizing agents, such as sodium peroxide, and observing the resulting change in color. When this technique is adopted it is, of course, advisable to have at hand a sample of the soil which was planted so that the color values of the collected sample can be compared with the standard. Other methods of examination include separation of heavy hydrocarbons by extraction or otherwise, the rate of absorption of a hydrocarbon air mixture by the sample, etc. The method for determining the bacterial content of samples by measuring their rate of absorption of a hydrocarbon-air mixture is described and claimed in my co-pending application Serial No. 277,891, filed June 7, 1939, and entitled Oil prospecting method in which is described a procedure according to which each individual sample is placed in a confined space into which is fed an atmosphere of air and a hydrocarbon, such as ethane or propane, until a predetermined pressure is established, and then the rate of pressure drop with time is recorded. This rate of pressure drop, or total pressure drop over a given period of time, is a measure of the bacterial content of the soils insofar as these bacteria are capable of consuming hydrocarbons. In all cases, anomalous increases in bacterial or hydrocarbon content of the planted samples indicates the presence of subterranean deposits of petroleum below the point where the sample was planted. By suitably arranging the samples in the area under investigation, it is possible to draw contour maps based on the results of the tests applied to the samples after their collection on which can be indicated those samples having similar content of heavy hydrocarbons or bacteria, and these points can be connected by contour lines in the manner ordinarily adopted for the drawing of gravity contour maps.

The nature and objects of the present invention having been thus described, what is claimed as new and useful and is desired to be secured by Letters Patent is:

A method for prospecting for subterranean petroleum deposits which comprises inoculating soil samples with hydrocarbon consuming bacteria, planting these samples at spaced intervals in the area under investigation, allowing the planted samples to remain in place a sufficient period to permit propagation of the bacteria by naturally occurring hydrocarbons, then collecting the soil samples and examining them for evidence of further reaction between the originally contained bacteria and hydrocarbons.

MILLARD S. TAGGART, Jr.